March 7, 1950 A. LIEBSCHER 2,499,514
BEAT FREQUENCY SWEEP OSCILLATOR
Filed Feb. 27, 1945
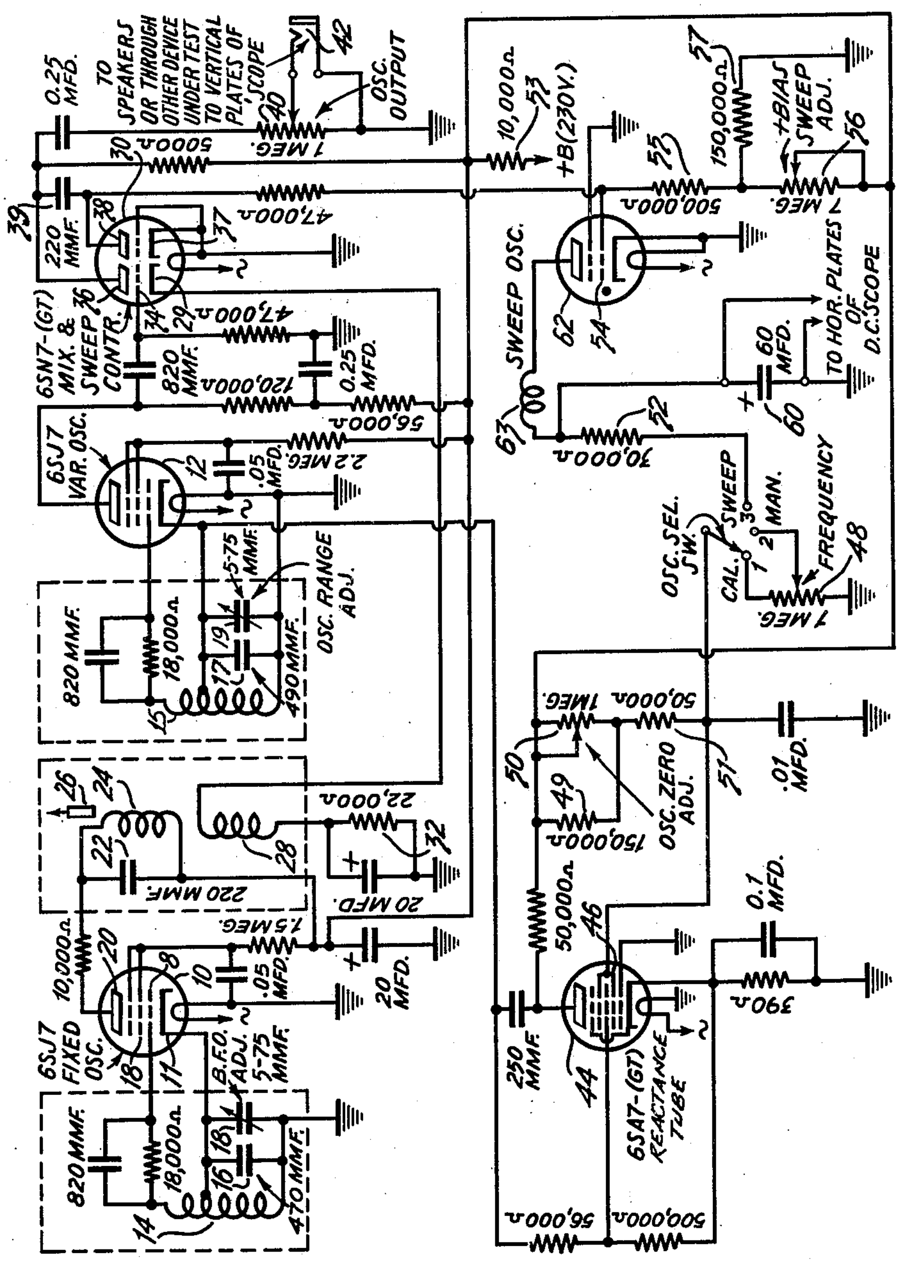
INVENTOR.
Arthur Liebscher
BY [signature]
ATTORNEY.
WITNESSES:
F. J. Harbaugh
F. M. Lundahl Patented Mar. 7, 1950 2,499,514

UNITED STATES PATENT OFFICE 2,499,514

BEAT FREQUENCY SWEEP OSCILLATOR

Arthur Liebscher, Philadelphia, Pa., assignor to Radio Corporation of America, a corporation of Delaware Application February 27, 1945, Serial No. 579,959

11 Claims. (Cl. 250—36)

The invention relates to signal generators and more particularly to an audio beat frequency sweep oscillator, and method of operating same.

An object of the invention is to provide a method and means for testing audio frequency systems, loudspeakers and other transducers.

Another object of the invention is to produce an audio frequency signal suitable for testing loudspeakers, particularly to locate a defective speaker remotely located from the amplifier in a multiple loudspeaker installation.

Another object of the invention is to provide a method and means for automatically and cyclically varying the frequency of a signal generator over a desired frequency range in a predetermined manner.

Another object of the invention is to provide a signal generator for producing a signal useful with a cathode ray oscilloscope for automatic curve tracing, photographically or otherwise, to determine the fidelity or characteristics of audio frequency apparatus.

Another object of the invention is to automatically detect the presence of an impulse or signal within a given band of frequencies explored.

In accordance with the present invention a beat frequency oscillator is provided with means for causing the oscillator to periodically and automatically sweep over a predetermined range of audio frequencies, the rate of sweep preferably being non-uniform, slowing up the sweep at the lower frequency end of the range. Further in accordance with the invention the initiation of the sweep is controlled by the output from the beat frequency oscillator, triggering the sweep periodically in synchronism with a predetermined change in signal amplitude. The system is characterized by reliability of operation, ease of adjustment, and simplicity of circuit. The circuit is entirely electrical in nature, no mechanically driven parts. The system is useful in testing loudspeaker installations such as announce systems, public address and inter-office communication circuits, as well as individual loudspeakers. The beat frequency oscillator is arranged to generate voltage in the audio frequency range of say zero to ten thousand cycles, adjusted manually for certain tests. When the system is connected for automatic sweeping through the frequency range it is preferably arranged to sweep from around three thousand to zero cycles for a duration of approximately twelve seconds. In this mode of operation the system is particularly useful in locating defects, e. g. in one or more speakers in multiple speaker installations. Difficulties such as spurious resonances, rattles and the like which occur at particular frequencies may be readily located. The invention relates broadly to the type of apparatus shown in the patents to Arnold 1,573,367, Sherman 2,215,197 and Bagno 2,153 313, and may be considered to be an improvement thereover.

In accordance with another aspect of the invention a mode of operation of the system, above described, may be reversed and it may then be used to automatically detect the presence of a first signal, or subsequently a second and different signal, and so on, in a band of frequencies, which being scanned by associated apparatus can be used to operate automatic switching corresponding to the first and second signals.

Referring to the drawing, the figure shows a schematic circuit diagram of the electrical connections and the component parts of the system involving the present invention, the circuit shown being part of a test equipment known as the Audio Chanalyst RCA type #170A which comprises principally a vacuum tube voltmeter system, a calibrated audio amplifier and the beat frequency sweep oscillator.

The beat frequency oscillator shown in the drawing comprises a semi-fixed adjustable oscillator, comprising tube 10, of the electron coupled type tuned to a predetermined mean frequency, and a second oscillator comprising tube 12, likewise of the electron coupled type, variable in tuning throughout a range of frequencies, either manually or automatically with a periodical sweep as hereinafter explained. Oscillator 10 is provided with a tuned circuit comprising a tapped inductor 14, fixed capacitor 16 and adjustable capacitor 18, the latter two being connected to a suitable point on the inductor, to which point is likewise connected cathode 11 of tube 10. One end of the inductor, or tuned circuit, is grounded as shown while the high potential end is connected through a grid leak and capacitor to control grid 8 of tube 10. The screen grid 18 of the tube is effectively connected to ground, hence to the low potential end of the tuned circuit, as shown. The output is taken from the anode 20 to a tuned output circuit comprising a capacitor 22 and an inductor 24 adjustable by means of an iron core 26 of the type disclosed in Harvey Patent 2,283,924, May 26, 1942. The tube 10 is adjusted to oscillate at some desired mean frequency preferably an intermediate high frequency, e. g. of the order of 350 kc. and the output energy in the anode circuit is fed through a coupling coil 28 into the circuit of a cathode 29 of a mixer tube 30, type 6SN7-(GT), the cathode receiving its bias by means of the self-bias resistor 32, by-passed by a suitably large capacitor.

The second oscillator 12 is independently tuned to a slightly different mean high frequency, relative to that of the first named oscillator, and its output is fed into the circuit of a grid 34 of the same mixer tube, this arrangement being substantially similar to that disclosed in Kellogg Reissue Patent 20,114. The second named oscillator is likewise an electron coupled oscillator and the action of this type of oscillator is well known, being disclosed in Dow Patent 2,168,924, August 8, 1939.

The outputs of the two oscillators, adjusted relatively so as to oscillate at some desired audio frequency difference, are mixed in the first triode section of vacuum tube 30 and beat together to form a low beat frequency. The mixer section of the tube 30 detects the beat frequency and the resulting audio frequency is fed from the anode through a stopping capacitor of the order of 0.25 mfd. to a volume control potentiometer 40, thence to phonejack 42. The output impedance at this points is about 5000 ohms at one volt in the actual apparatus. The anode 36 of the mixer section of the vacuum tube 30 is coupled also through a capacitor 39 of suitably small size to the anode 38 of another section of tube 30, connected as a diode rectifier, where some of the signal is rectified to derive a D. C. bias. By having capacitor 39 relatively small, together with the proper values of resistance, a short time constant is realized for insuring quick triggering release of a gas tube 62, later described, as the signal reaches zero beat. Instead of a gas tube, a vacuum type electron discharge tube may be used, and the term thermionic will be used to define both.

The resonant oscillator circuit of the tube 12, comprising inductor 15 and capacitor 17, after being fixed at some particular frequency by means of adjustable capacitor 19, is variably tuned or frequency modulated by means of a reactance tube 44. The plate and grid circuit of the reactance tube are shunted across the tuning capacitor 19 in such manner that the variable reactance characteristic of this reactance tube controls the frequency of the tuned circuit of tube 12 in a manner disclosed generally by Jones Patent 1,777,410, October 7, 1930. The mutual conductance of tube 44 is governed by the voltage on the screen grid 46, and as the mutual conductance is changed, the inductive reactance characteristic of the tube varies and hence changes the tuning of the resonant circuit of oscillator tube 12. Manual control of frequency is effected by varying a resistor 48, with the arm of the selector switch turned to terminal 2. It will be seen that varying the resistor 48 changes the voltage on screen grid 46 by reason of the fact that this resistor is included in a potential divider circuit comprising resistors 49, 50 and 51 the high side of which is connected to the B supply source of voltage marked +B through a resistor 53.

While it has been shown that one oscillator is fixed and one varied, both may be varied simultaneously in opposite manner, if desired, as shown broadly in another arrangement by Schafer Patent 1,717,630. Although an arrangement for obtaining an audio frequency beat has been disclosed the system may be readily adapted to produce a super audible or video frequency beat or difference frequency. While a beat frequency oscillator is preferred as a source of oscillations, the invention may be used with a single oscillator working at the desired frequencies.

By substituting a charging capacitor 60 for the resistor 48, in turning arm SW to switch point 3, the control of frequency can be made automatic in nature when the voltage developed across large capacitor 60 is varied as explained below. The rate of frequency change will depend upon the resistance-capacity time constant involved and to obtain an automatic sweep frequency it is necessary to periodically charge and discharge this capacitor 60. As soon as the switch SW is thrown to the sweep position 3 the condenser 60 is charged slowly from the supply voltage source through the resistors 53, 49, 50, 51 and 52. As the capacitor is charged, the voltage rises and increases the voltage applied to the screen grid 46 of tube 44. In order to discharge the capacitor a gaseous discharge tube 62 known as a "thyraton" No. 2050 is connected across capacitor 60 and functions as a thermionic switch controlled by the bias on its control grid 54. The anode to cathode discharge path of this tube is connected directly across capacitor 60, of a capacity, preferably of the order of 60 mfd., value sufficient to produce a ten or twelve second sweep. During the sweep period the discharge action of this gas tube is maintained inoperative by means of a small negative bias voltage sufficient to keep the discharge tube current at cutoff, and its output impedance relatively high. This bias is obtained from the output of the diode section of tube 30, in the manner above explained.

So long as there is an appreciable audio frequency output from the mixer section of the tube 30, sufficient negative bias is developed to prevent the thyratron tube from firing or conducting, with a resultant sharp decline in the output impedance thereof. As the audio frequency sweep approaches very low frequencies the audio output voltage decreases, until at zero beat it suddenly dips to substantially zero voltage. At this point the rectified output of the tube 30 also drops to a low value and thereby temporarily removes the negative bias from grid 54 of the gas tube, causing it to discharge, lowering its impedance and short circuiting the capacitor 60, thereby dissipating the charging current and completing its cycle. When the gas tube discharges, the voltage previously built up on the capacitor 60 drops to a level sufficiently low that the gaseous discharge is quenched. Meanwhile, the resulting changing load is restrained from interfering with this action because of the current limiting action of resistor 52 and other resistance in series between the capacitor and the B supply of high voltage. A reactor 63 can be inserted in the anode lead of the gas tube to limit the initial discharge wave peak thus protecting said tube. Instead of a gas tube, a vacuum electron discharge tube of the appropriate type may be used, and the term thermionic will be used to define both types generically.

The capacitor 60 next starts to charge exponentially at a time when the generator is producing a resultant beat frequency of around three thousand cycles. As the charge builds up, the frequency decreases as a result of the action of the reactance tube 44 upon the tuned circuit of tube 12. The rate of change of frequency toward the lower end of the range decreases, a desirable effect due to the exponential charging. For testing purposes it is advantageous that the lower frequencies have a slower sweep rate. This is a result of causing the low frequency end of the sweep to occur in the region of maximum charge on the capacitor. In making the sweep recurrent it is desirable to discharge the capacitor as rapidly as possible and to charge the capacitor slowly and at a variable rate as above explained. In making a sweep signal test for speaker defects with this circuit, when a spurious resonance or the like is detected by ear, the switch is then connected to the manual position 2 and the frequency is adjusted manually until the defect again is audible. The frequency at which it occurs is then observed on a meter or on a calibrated scale of resistor 48.

By way of summary, the frequency of R.-F. oscillator 12 is electronically varied by means of tube 44 with a corresponding output audio frequency of approximately three thousand cycles as the capacitor 60 starts to charge, in such manner that the output beat frequency drops to zero beat. The resultant output voltage at this point also drops to such a low value that the gas tube is caused to fire and discharge the capacitor, thereby rapidly returning the sweep frequency to approximately three thousand cycles for the beginning of another cycle of operation. Deflecting voltage connections may be made to a cathode ray oscillograph, as indicated on the drawing, for visual test indication.

In referring to the bias voltage impressed on the thyratron gas tube it has been assumed that the gas tube will trigger and discharge immediately when the negative bias is removed. Actually the charge leaking off of the grid circuit of the gas tube may delay this action, so it has been found desirable to establish a small positive bucking voltage of a value adjusted to assure quick trigger action when the effect of the negative diode bias voltage is removed. This positive bucking voltage is fed through resistor 55 from resistors 56 and 57, the latter being connected as a potential divider to the B supply lead.

Previously it has been shown that slow sweep frequency action continued so long as the beat frequency output voltage existed and was rectified to supply the D. C. negative bias. This process can be altered by reversing the polarity of the rectified control voltage from rectifier 37—38 and that of the above-mentioned positive bucking voltage. If the diode connections are reversed so that the output signal is rectified to produce a positive triggering voltage, it can be applied to overcome negative bias voltage of a bucking source so adjusted as to keep the discharge tube normally at cutoff. Hence, instead of the gas tube being triggered by a decrease in negative bias, it will be actuated by the presence of a positive impulse at some frequency. As a practical application this reversed action can be used to automatically detect the presence of a signal within a given frequency band, which being scanned by the sweep oscillator action, can be extended to actuate automatic switching when a signal, and subsequently new and different signals are involved. In the absence of a signal adapted to trigger the tube, a voltage impulse at a predetermined frequency, as at end of the range, will trigger the tube to reset the sweep to its starting position.

The above arrangement can be used to actuate relays to switch in various receiving channels and hold the channels in operation during communication. The sweep action can be made to skip channels already in use, by rectifying the negative half-wave voltage of the signal being received and using the resulting voltage to counteract or balance the positive derivative of the signal as it is repeatedly scanned. In such a case only the new signals actuate the trigger or gas tube circuit since the signals already accepted have had time to build up a balancing voltage, making their detection ineffective.

While particular embodiments of my invention have been disclosed, it will be understood that I do not wish to be limited thereto since other and different modifications in the circuit and apparatus employed may be made and I contemplate by the appended claims to cover any such modifications as fall within the true spirit and scope of the invention.

I claim as my invention:

1. In a signal generator, first and second radio frequency oscillators tunable to oscillate at different frequencies, respectively, means for combining the output oscillatory voltages from said oscillators to produce a difference frequency voltage, means for frequency modulating at least said second oscillator to produce a resultant sweep in said difference frequency over a range extending downwardly to zero frequency, means for deriving a control bias from said difference frequency voltage and means responsive to said bias corresponding to substantially zero difference frequency for actuating said second named means to periodically frequency modulate said second oscillator.

2. The invention as set forth in claim 1 wherein said second named means includes a charging capacitor and reactance tube operatively connected to said second oscillator, whereby said oscillatory voltage is varied periodically from several thousand to zero cycles, said bias decreasing substantially in response to decrease of said voltage at zero frequency.

3. In thermionic apparatus, means for generating an oscillatory voltage, sweep means for frequency modulating said first named means over a frequency range in a direction of decreasing frequency, means for deriving a control potential from a substantial change in said voltage corresponding to a relatively low frequency in said range, and means responsive to said potential for periodically actuating said sweep means.

4. In thermionic apparatus, means for generating an oscillatory voltage, sweep means for varying the frequency of said generating means over a frequency range from a relatively high frequency to a low frequency at which the voltage declines substantially, means for deriving a control potential from said decline in voltage, and means controlled by said potential decline for resetting said sweep means to a condition corresponding to said relatively high frequency for periodically varying the frequency of said generating means.

5. In a signal generator, means for generating an oscillatory voltage, reactance means for frequency modulating said first named means to produce a sweep in the frequency of said voltage, rectifying means for deriving from said voltage a control bias, a thermionic discharge relay connected with said rectifying means and maintained in a relative high output impedance condition by said bias, a capacitor connected to an output electrode of said relay and arranged to be quickly discharged by said relay in response to a substantial decline in said bias, a circuit for slowly charging said capacitor, and circuit connections between said reactance means and said capacitor for deriving a potential from said capacitor to effect a tuning variation by said reactance means as a function of the potential on said capacitor.

6. In a signal generator, first and second radio frequency oscillators tunable to oscillate at different frequencies, respectively, electronic mixing means for combining the oscillatory output voltages from said oscillators to produce a difference frequency voltage, an electronic reactance control device operatively connected to said second oscillator for frequency modulating said oscillator to produce a resultant sweep in said difference frequency, means for applying said difference frequency voltage to a device under test, a gaseous discharge relay having a charging capacitor connected in its output circuit, said capacitor being connected to said reactance control device for variably controlling reactance as a function of the potential on said capacitor, rectifying means connected in circuit with said mixing means for deriving from said difference frequency voltage a control bias for maintaining said gaseous discharge device inoperative over said frequency sweep and for causing said discharge device to discharge said capacitor as a function of said difference frequency voltage at one end of said sweep.

7. The invention as set forth in claim 6 characterized in that a bias of opposing polarity is provided in circuit with said rectifying means for expediting a change in said control bias at one end of the sweep.

8 In a signal generator, first and second radio frequency oscillators of the electron coupled type tunable to oscillate at different frequencies, respectively, a thermionic reactance varying device having cathode, control grid, screen grid and anode and connected across at least a portion of the tuned circuit of said second oscillator, a relatively large capacitor operatively connected to said screen grid, a circuit for charging said capacitor whereby the voltage on said screen grid is a function of the voltage developed on said capacitor for controlling the reactance effects of said thermionic device, means for combining the output oscillatory voltages from said oscillators to produce an alternating difference frequency voltage, means for deriving from said voltage a control bias, and means responsive to a substantial decrease in said bias for discharging said capacitor.

9. In a signal generator, first and second radio frequency oscillators tunable to oscillate at different frequencies, respectively, an electronic mixing device for combining the output oscillatory voltages from said oscillators to produce an alternating difference frequency voltage, an output circuit for adjustably applying said voltage to a load circuit, means comprising a rectifier and a capacity-resistor network characterized by a relatively short time constant for deriving a control direct current negative bias from said alternating voltage, a gaseous discharge relay having output and input electrodes, circuit means including a source of opposing bias for applying said control bias to said input electrodes, a charging capacitor connected to said output electrodes, high resistance charging circuit connected between a high voltage source and said capacitor, an electronic variable reactance device operatively connected to said capacitor and with said second oscillator whereby the tuning of said second oscillator is varied by said reactance device as a function of the voltage on said capacitor, said gaseous discharge device being characterized in that a gaseous discharge occurs and discharges said capacitor when said negative bias on said control electrode drops below a predetermined amount.

10. In apparatus of the class described, a source of radio frequency voltage of a given fixed frequency, means for generating a second radio frequency voltage, mixer means connected with said source and said first named means for detecting a frequency difference between said voltages, sweep means for frequency modulating said first named means over a frequency range toward a point in said range to produce zero beat frequency between said voltages, at which point the detected voltage changes substantially, means for deriving a control potential from said change in said detected voltage corresponding to said zero beat frequency, and means responsive to said potential for controlling said sweep means.

11. In apparatus of the class described, a source of radio frequency voltage of a given fixed frequency, means for generating a second radio frequency voltage, mixer means connected with said source and said first named means for detecting a frequency difference between said voltages, sweep means for varying the frequency of said generating means over a frequency range from one end thereof to a point that produces with said fixed frequency a zero beat frequency, at which point the detected voltage declines substantially, means for deriving a control potential from said decline in voltage, and means controlled by said potential decline for resetting said sweep means to a condition corresponding to that at said one end for periodically varying the frequency of said generator means.

ARTHUR LIEBSCHER.

REFERENCES CITED

The following references are of record in the file of this patent:

UNITED STATES PATENTS

| Number | Name | Date |
|---|---|---|
| 2,143,864 | Conklin et al. | Jan. 17, 1939 |
| 2,145,483 | Jacob | Jan. 31, 1939 |
| 2,162,335 | Jacob | June 13, 1939 |
| 2,189,457 | Archer | Feb. 6, 1940 |
| 2,201,978 | Bedford | May 28, 1940 |
| 2,203,750 | Sherman | June 11, 1940 |
| 2,205,190 | Farrington | June 18, 1940 |
| 2,254,601 | Felch, Jr. | Sept. 2, 1941 |
| 2,287,925 | White | June 30, 1942 |
| 2,355,338 | Stewart | Aug. 8, 1944 |